US009225440B2

United States Patent
Swarts et al.

(10) Patent No.: US 9,225,440 B2
(45) Date of Patent: *Dec. 29, 2015

(54) METHOD AND SYSTEM FOR MULTIPLE FREQUENCY HYPOTHESIS TESTING WITH FULL SYNCH ACQUISITION IN AN E-UTRA/LTE UE RECEIVER

(75) Inventors: Francis Swarts, San Diego, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 622 days.

This patent is subject to a terminal disclaimer.

(21) Appl. No.: 13/620,035

(22) Filed: Sep. 14, 2012

(65) Prior Publication Data

US 2013/0176941 A1  Jul. 11, 2013

Related U.S. Application Data

(63) Continuation of application No. 12/510,956, filed on Jul. 28, 2009, now Pat. No. 8,462,647.

(51) Int. Cl.
  *H04J 3/16* (2006.01)
  *H04B 17/00* (2015.01)
  (Continued)

(52) U.S. Cl.
  CPC .............. *H04B 17/004* (2013.01); *H04B 17/20* (2015.01); *H04J 3/0614* (2013.01); *H04J 11/0073* (2013.01); *H04J 11/0076* (2013.01)

(58) Field of Classification Search
  CPC ............... H04B 17/004; H04J 11/0073; H04J 11/0076; H04J 3/0614
  USPC .................. 370/349, 325, 350, 470, 471, 474
  See application file for complete search history.

(56) References Cited

U.S. PATENT DOCUMENTS 6,721,797 B1   4/2004  Kim
7,436,878 B1  10/2008  Harris et al.
(Continued)

FOREIGN PATENT DOCUMENTS

CN        1346182 A    4/2002
CN      101420267 A    4/2009
(Continued)

OTHER PUBLICATIONS

Qualcomm Europe, "Further Analysis of Intial Cell Search for Approach 1 and 2-Multi-Cell Scenario," 3rd Generation Partnership Project (3GPP) Draft, Sorrento, Italy, Jan. 2007.
(Continued)

*Primary Examiner* — Brenda H Pham
(74) *Attorney, Agent, or Firm* — Sterne, Kessler, Goldstein & Fox P.L.L.C.

(57) ABSTRACT

A mobile device receives a radio frequency (RF) signal comprising a primary synchronization sequence (PSS) and a secondary synchronization sequence (SSS). The mobile device performs multiple frequency hypothesis (MFH) testing via multiple MFH branches. A SSS decoding and a PSS correlation process are performed, respectively, per MFH branch. The SSS decoding may be performed according to corresponding PSS detection. Cell-specific information such as cell ID information and/or Cyclic Prefix (CP) length is acquired per MFH branch based on corresponding PSS detection and SSS decoding. Subsequently, the mobile device selects a particular MFH branch with a maximum PSS correlation peak over the entire MFH branches. The cell-specific information from the selected MFH branch is utilized for communications within a corresponding cell if the information is detected consistently. The mobile device compares cell ID information and/or CP length information over the remaining MFH branches for consistency check.

20 Claims, 6 Drawing Sheets

(51) Int. Cl.
*H04J 11/00* (2006.01)
*H04J 3/06* (2006.01)
*H04B 17/20* (2015.01)

(56) References Cited

U.S. PATENT DOCUMENTS

| | | | |
|---|---|---|---|
| 7,764,726 B2 * | 7/2010 | Simic et al. | 375/150 |
| 7,835,327 B2 | 11/2010 | Hahm et al. | |
| 7,894,404 B2 | 2/2011 | Hahm et al. | |
| 8,059,767 B2 | 11/2011 | Furman et al. | |
| 8,462,647 B2 * | 6/2013 | Swarts et al. | 370/252 |
| 2002/0054624 A1 | 5/2002 | Boloorian | |
| 2003/0012268 A1 | 1/2003 | Doetsch et al. | |
| 2003/0099206 A1 | 5/2003 | Jones et al. | |
| 2004/0062298 A1 | 4/2004 | McDonough et al. | |
| 2004/0120252 A1 | 6/2004 | Bowen, Jr. et al. | |
| 2005/0238087 A1 | 10/2005 | Yang et al. | |
| 2007/0218854 A1 | 9/2007 | Lawrence et al. | |
| 2008/0019350 A1 | 1/2008 | Onggosanusi et al. | |
| 2008/0080463 A1 | 4/2008 | Stewart et al. | |
| 2008/0090600 A1 | 4/2008 | Demir et al. | |
| 2008/0112469 A1 * | 5/2008 | Goldberg et al. | 375/150 |
| 2008/0205375 A1 | 8/2008 | Onggosanusi et al. | |
| 2009/0017768 A1 | 1/2009 | Makarov | |
| 2009/0034501 A1 | 2/2009 | Hahm et al. | |
| 2009/0034589 A1 | 2/2009 | Hahm et al. | |
| 2009/0041162 A1 | 2/2009 | Li et al. | |
| 2009/0086713 A1 | 4/2009 | Luo | |
| 2009/0219883 A1 | 9/2009 | Cho et al. | |
| 2010/0098031 A1 | 4/2010 | Charbit | |
| 2010/0128824 A1 | 5/2010 | Hui | |
| 2010/0158079 A1 | 6/2010 | Li et al. | |
| 2010/0182979 A1 | 7/2010 | Malladi et al. | |
| 2011/0026413 A1 | 2/2011 | Swarts et al. | |
| 2011/0026648 A1 | 2/2011 | Swarts et al. | |
| 2011/0026649 A1 | 2/2011 | Lipka et al. | |
| 2011/0151817 A1 | 6/2011 | Swarts et al. | |
| 2011/0223901 A1 | 9/2011 | Swarts et al. | |

FOREIGN PATENT DOCUMENTS

| | | |
|---|---|---|
| CN | 101986745 A | 3/2011 |
| EP | 1 677 429 A1 | 7/2006 |
| EP | 2 020 756 A2 | 2/2009 |

OTHER PUBLICATIONS

European Search Report for EP Application No. EP 10 00 7699, Munich, Germany, dated Apr. 1, 2013.
Chinese Office Action directed to related Chinese Patent Application No. 201010239093.5, mailed Dec. 4, 2012; 8 pages.
Taiwanese Office Action directed to related Taiwanese Patent Application No. 099124831, mailed Nov. 11, 2013; 5 pages.

* cited by examiner

METHOD AND SYSTEM FOR MULTIPLE FREQUENCY HYPOTHESIS TESTING WITH FULL SYNCH ACQUISITION IN AN E-UTRA/LTE UE RECEIVER

CROSS-REFERENCE TO RELATED APPLICATIONS

This application is a continuation of U.S. patent application Ser. No. 12/510,956, filed Jul. 28, 2009, now pending, and makes reference to co-pending U.S. patent application Ser. No. 12/510,901, each of which is hereby incorporated by reference in its entirety.

FIELD OF THE INVENTION

Certain embodiments of the invention relate to communication systems. More specifically, certain embodiments of the invention relate to a method and system for multiple frequency hypothesis testing with full synch acquisition in an E-UTRA/LTE UE receiver.

BACKGROUND OF THE INVENTION

Various communication standards such as Evolved Universal Terrestrial Radio Access (E-UTRA), also called Long Term Evolution (LTE), have been developed to offer comparatively high data rates to support high quality services. LTE is a Third Generation Partnership Project (3GPP) standard that provides for an uplink speed of up to 50 megabits per second (Mbps) and a downlink speed of up to 100 Mbps. The LTE/E-UTRA standard represents a major advance in cellular technology. The LTE/EUTRA standard is designed to meet current and future carrier needs for high-speed data and media transport as well as high-capacity voice support. The LTE/E-UTRA standard brings many technical benefits to cellular networks, some of which include the benefits provided by Orthogonal Frequency Division Multiplexing (OFDM) and/or Multiple Input Multiple Output (MIMO) data communication. In addition, Orthogonal Frequency Division Multiple Access (OFDMA) and Single Carrier Frequency Division Multiple Access (SC-FDMA) are used on the downlink (DL) and on the uplink (UL), respectively.

Mobility management represents an important aspect of the LTE/E-UTRA standard. As a mobile device, also called user equipment (UE) in the LTE/E-UTRA standard, moves within an LTE/E-UTRA coverage area, the use of synchronization signal transmissions and cell search procedures provide a basis for the mobile device or UE to detect and synchronize with individual cells. To communicate with a particular cell, mobile devices in associated LTE/E-UTRA coverage area needs to determine one or more cell specific transmission parameters such as, for example, symbol timing, radio frame timing, and/or a cell ID. In the LTE/E-UTRA standard, the cell-specific information is carried by reference and/or synchronization signals. The latter forms the basis for downlink (DL) synchronization and cell specific information identification at the mobile devices within the associated LTE/E-UTRA coverage area. Two downlink (DL) synchronization signals, namely Primary Synchronization Signal (PSS) and Secondary Synchronization Signal (SSS), are used to allow the mobile devices to synchronize to transmission timing of the particular cell, and thereby obtain cell specific information such as full physical Cell ID, and/or a Cell ID group indicator.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for multiple frequency hypothesis testing with full synch acquisition in an E-UTRA/LTE UE receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF A PREFERRED EMBODIMENT

Certain embodiments of the invention may be found in a method and system for multiple frequency hypothesis testing with full synch acquisition in an E-UTRNLTE UE receiver. A mobile device is operable to receive a radio frequency (RF) signal from an associated base station. The received signal may comprise a PSS and a SSS, which may be used by the mobile device, which is also referred to as a UE, to acquire cell-specific parameters via the PSS synchronization and the SSS detection, respectively. To overcome uncertainties on the correct PSS symbol timing and/or correct frequency offset for the received PSS, the mobile device may be operable to perform a multiple frequency hypothesis (MFH) testing. The mobile device may be operable to perform the MFH testing using a set of MFH branches. The mobile device may be operable to decode the received SSS in each of the set of MFH branches. The mobile device may be operable to perform a PSS correlation process per MFH branch. Resulting correlation data may be integrated over multiple radio frames, for example. The received PSS may be detected by selecting a candidate PSS for the received PSS based on the resulting PSS correlation peak magnitudes. Resulting PSS detection information may be provided and/or used for the SSS decoding per MFH branch. Cell-specific information such as cell ID information and/or CP length information may be acquired per MFH branch based on corresponding PSS detection and SSS decoding within the MFH branch. After acquiring cell-specific information per MFH branch, the mobile device may be operable to select a particular MFH branch with a maximum PSS correlation peak over the entire set of MFH branches. The cell-specific information from the selected MFH branch may be utilized for communications within a corresponding cell. An additional check on the validity of the cell-specific information may be performed by assessing whether the cell specific information may be detected consistently over the period of PSS/SSS acquisition/detection. The mobile device may also be operable to compare the cell ID information and/or CP length information over the entire set of MFH branches for an additional consistency check, which may add confidence to the detected cell-specific information when such consistency exists. Even in the absence of a consistency indication, either within, or additionally across the set of MFH branches, the frequency offset estimates from the selected MFH branch may be applied to the UE reference oscillator frequency in order to compensate for the initial frequency offset that may exist between the base station carrier frequency and the UE local oscillator frequency.

Figure 1:
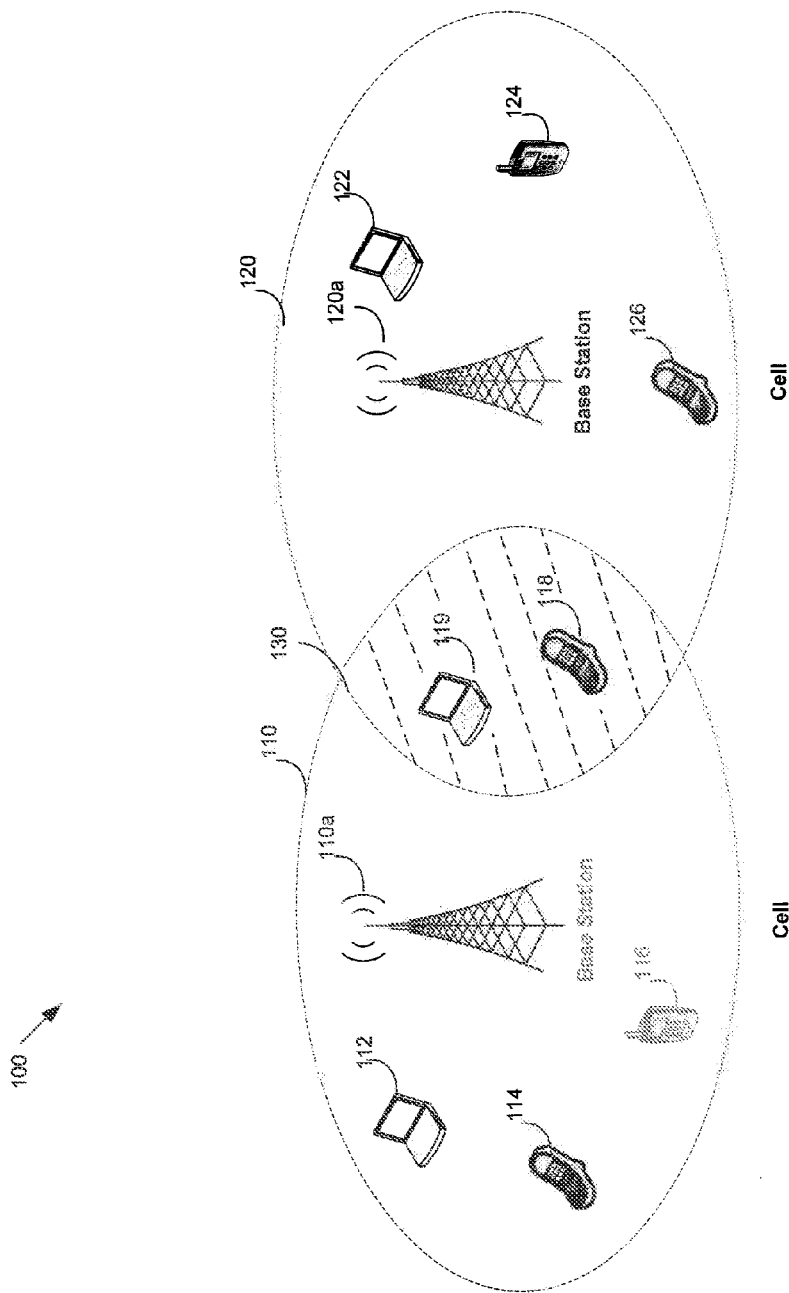
FIG. 1 is a diagram illustrating an exemplary LTE/E-UTRA communication system that is operable to perform multiple frequency hypothesis testing with full synch acquisition in an E-UTRA/LTE UE receiver, in accordance with an embodiment of the invention.

FIG. 1 is a diagram illustrating an exemplary LTE/E-UTRA communication system that is operable to perform multiple frequency hypothesis testing with full synch acquisition in an E-UTRA/LTE UE receiver, in accordance with an embodiment of the invention. Referring to FIG. 1, there is shown a LTE/E-UTRA communication system 100. The LTE/E-UTRA communication system 100 comprises a plurality of cells, of which cells 110-120 are displayed. A LTE/E-UTRA coverage area 130 is the overlapped coverage area of the cell 110 and the cell 120. The cell 110 and the cell 120 are associated with a base station 110a and a base station 120a, respectively. The LTE/E-UTRA communication system 100 comprises a plurality of mobile devices, of which mobile devices 110-126 are illustrated. The mobile devices 112-116 are shown located in the cell 110. The mobile devices 122-126 are shown located in the cell 120. The mobile device 118 and the mobile device 119 are shown located in the overlapped LTE/E-UTRA coverage area 130.

A base station such as the base station 110a may comprise suitable logic, circuitry, interfaces and/or code that are operable to manage various aspects of communication, for example, communication connection establishment, connection maintenance and/or connection termination, with associated mobile devices within the cell 110. The base station 110a may be operable to manage associated radio resources such as, for example, radio bearer control, radio admission control, connection mobility control, and/or dynamic allocation of radio resources within the cell 110 in both uplink and downlink communication. The base station 110a may be operable to utilize physical channels and physical signals for communications in both the uplink and the downlink communication. The physical channels may carry information from higher layers to communicate user data as well as user control information. The physical signals such as synchronization signals may not carry information from higher layers. In the LTE/E-UTRA standard, the base station 110a may be operable to transmit a primary synchronization signal (PSS) and a secondary synchronization signal (SSS).

The base station 110a may be operable to transmit the PSS and the SSS on a per 5 ms basis, in the last two OFDM symbols of the first and eleventh slot in each radio frame. The PSS is chosen from a variety of Zadhoff-Chu sequences, carrying the information of the identity of the base station or cell within a cell group. The SSS is a sequence carrying the information about the cell group, encoded with a scrambling sequence, which is unique to an associated mobile device. The scrambling code may be linked or mapped to, for example, the index of the PSS. After successful time and frequency synchronization via the PSS synchronization, the frame boundary synchronization and/or the cell identification may be performed via SSS detection. The transmission of the PSS and the SSS may allow timing and frequency offset issues to be resolved before cell-specific information may be determined. This may reduce complexity in initial cell search and/or handover modes for associated mobile devices such as the mobile device 114 and the mobile device 118.

A mobile device such as the mobile device 118 may comprise suitable logic, circuitry, interfaces and/or code that may be operable to communicate with a base station such as the base station 110a for services supported, for example, in the LTE/E-UTRA standard. To communicate with the base station 110a, the mobile device 118 may be operable to determine one or more transmission parameters used by base station 110a. Such information may be obtained by, for example, decoding a Broadcast Channel (BCH) signal from the base station 110a. To that end, the mobile device 118 may need to synchronize to corresponding symbol timing and frame timing of transmissions from the base station 110a so as to acquire cell-specific parameters such as, for example, associated cell ID and/or antenna configuration. In this regard, the mobile device 118 may be operable to receive a plurality of PSSs and SSSs every 5 ms from neighbor or surrounding base stations such as the base station 110a and the base station 120a. The received plurality of PSSs is base station or cell specific.

The mobile device 118 may be operable to detect or select a particular PSS from the received plurality of PSSs to acquire PSS synchronization. The detected PSS may be used to estimate a channel. The resulting channel estimates may be utilized to decode or detect the associated SSS for frame boundary synchronization and cell group information identification. Various methods may be used by the mobile device 118 to detect or select the particular PSS out of the received plurality of PSSs. For example, the mobile device 118 may be operable to generate a plurality of correlation reference sequences (reference PSSs) each to correlate or match with the received plurality of PSSs, respectively. PSS correlation data may be accumulated in one or several time slot durations, for example. Resulting correlation peaks may indicate possible PSS symbol timing hypotheses under consideration. The mobile device 118 may be operable to detect the particular PSS according to the resulting correlation peaks. Furthermore, the mobile device 118 may be operable to utilize the PSS correlation data to estimate frequency offset associated with the particular PSS. Due to, for example, propagation delay, Doppler shift, and/or oscillator drift, there may be a wide range of uncertainty on the correct PSS symbol timing and/or correct frequency for the particular PSS.

The uncertainties for the correct PSS symbol timing and frequency offset for the particular PSS may cause the mobile device 118 to fail to detect the particular PSS when present, erroneously detect the particular PSS when none may be present, or detect the particular PSS but fail to estimate the correct PSS symbol timing and/or frequency offset, thereby losing data. In this regard, the mobile device 118 may be operable to perform multiple frequency hypothesis testing for frequency offset estimation. A set of intentional frequency offsets may be selected within the desired local oscillator frequency uncertainty range such as, for example, +/−15 ppm to evenly cover the desired frequency uncertainty range. One intentional frequency offset may be applied or placed to each multiple frequency hypothesis (MFH) branch in the multiple frequency hypothesis testing. The actual frequency of the selected intentional frequency offsets may be determined based on the desired frequency estimation resolution and available resources such as memory available within the mobile device 118 during the initial phase of synchronization/signal acquisition. A signal for the received particular PSS may be frequency offset per MFH branch according to the corresponding selected intentional frequency offset. Signal frequency offsetting may be achieved via frequency mixing.

The mobile device 118 may be operable to perform a PSS correlation process per MFH branch after frequency mixing. In each MFH branch, PSS correlation data may be accumulated over one or multiple time slots, for example. Resulting PSS correlation peaks (possible PSS symbol timing hypothesis) may be compared on the basis of correlation peak magnitudes so as to select a candidate PSS per MFH branch for the received PSS. The candidate PSS per MFH branch may be selected based on the maximum correlation peak magnitude in corresponding MFH branch. The selected candidate PSS may be used to estimate a channel per MFH. The resulting channel estimates may be utilized to decode or detect a candidate SSS per MFH branch for frame boundary synchronization, cell group information identification, and/or cyclic prefix (CP) length. A full synch acquisition may be performed per MFH branch. Within each MFH branch, by the time that a decision may be made about local oscillator frequency offset, cell-specific information such as cell ID and/or CP length may be declared as well. The mobile device 118 may be operable to select a particular MFH branch implied by the maximum PSS correlation peak magnitude over the entire set of MFH branches. The mobile device 118 may be operable to utilize information that comes from the selected particular MFH branch to start camping on a specific cell. The consistency of the corresponding cell-specific information over successive detection attempts per MFH branch, such as cell ID and/or CP length, may be taken into account when applying frequency estimates from the selected MFH branch for frequency control.

In an exemplary operation, the base station 110a may be operable to perform communications within the cell 110 using physical channels and physical signals such as a PSS and a SSS. The base station 110a may be operable to transmit base station specific PSS and SSS, regularly, for example, every 5 ms. To communicate with the base station 110a, a mobile device such as the mobile device 118 may be operable to acquire the PSS and SSS received from the base station 110a so as to determine one or more transmission parameters. For example, the mobile device 118 may be operable to acquire PSS synchronization to identify the PSS symbol timing and estimate a channel. The resulting channel estimates and the identified PSS symbol timing may be used to detect the received SSS for cell specific parameters such as frame boundary synchronization and/or cell group information.

The mobile device 118 may be operable to perform a multiple frequency hypothesis testing to acquire PSS symbol timing and estimate local oscillator frequency offset. The multiple frequency hypothesis testing may start with a set of intentional frequency offsets within the desired local oscillator frequency uncertainty range such as, for example, +/−15 ppm. The mobile device 118 may be operable to assign one intentional frequency offset per MFH branch. Each Different MFH branch may be assigned a different intentional frequency offset. In each MFH branch, a baseband signal associated with the received PSS may be frequency offset by the assigned intentional frequency offset. A PSS correlation process may be performed on the signal with the assigned intentional frequency offset to acquire the received PSS. A candidate PSS for the received PSS may be selected according to resulting PSS correlation peak magnitudes. The selected candidate PSS may be utilized to decode or detect a candidate SSS for frame boundary synchronization, cell group information identification, and/or cyclic prefix (CP) length. A full synch acquisition may be performed per MFH branch. A particular MFH branch implied by the maximum PSS correlation peak magnitude over the entire set of MFH branches, may be selected. Cell-specific information that originates from the selected particular MFH branch may be utilized by the mobile device 118 to start camping on a specific cell to get information from the network. The consistency of the corresponding cell ID information detected per MFH branch during successive detection attempts and across the set of MFH branches, may be taken into account when applying the frequency estimates from the selected MFH branch for frequency control.

Figure 2:
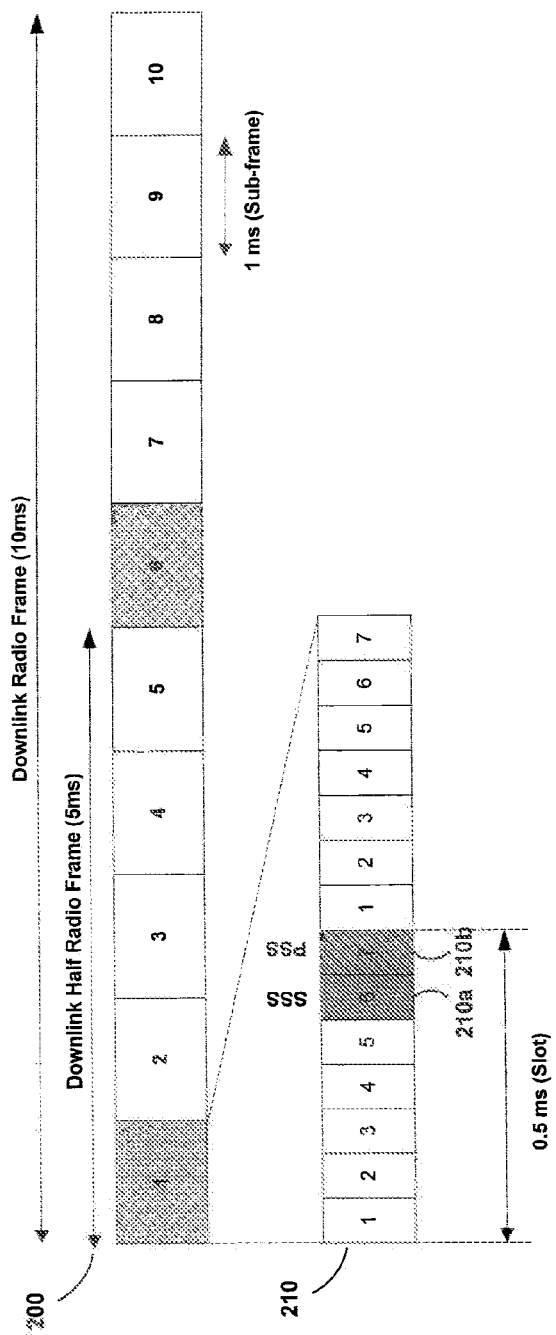
FIG. 2 is a block diagram of an exemplary E-UTRA/LTE downlink synchronization signal structure, which is utilized in accordance with an embodiment of the invention.

FIG. 2 is a block diagram of an exemplary E-UTRA/LTE downlink synchronization signal structure, which is utilized in accordance with an embodiment of the invention. Referring to FIG. 2, there is shown a downlink radio frame 200. In the LTE/E-UTRA standard, the downlink radio frame 200 may be divided into twenty equally sized slots with two contiguous slots arranged into a sub-frame such as the sub-frame 210. Downlink synchronization signals such as a PSS 210a and a SSS 210b may be transmitted from a base station such as, for example, the base station 110a and/or the base station 110b, to associated mobile devices such as the mobile device 118 so that the mobile device 118 may obtain correct timing for the downlink radio frame 200 and acquire cell-specific parameters such as, for example, associated cell ID and/or antenna configuration.

The PSS 210a and the SSS 210b may be transmitted on sub-frame 0 and 5 of the downlink radio frame 200 and occupy two consecutive symbols in a corresponding sub-frame. The PSS 210a may be used to identify the symbol timing and the cell ID within a cell ID group. The SSS 210b may be used for identifying frame boundary, detecting cell ID group, and/or acquiring system parameters such as cyclic prefix (CP) length. The SSS detection for the SSS 210b may start after a successful PSS synchronization on the PSS 210a. The PSS synchronization may provide timing and frequency offset information for the downlink radio frame 200. To acquire accurate timing and frequency offset for the downlink radio frame 200, multiple frequency hypothesis testing may be performed. A PSS correlation process for the PSS 210a may be combined in each MFH branch with frequency offset estimation. The SSS 210b may be detected per MFH after the detection of the PSS 210a for cell-specific parameters such as, for example, cell ID and/or cyclic prefix (CP) length.

Figure 3:
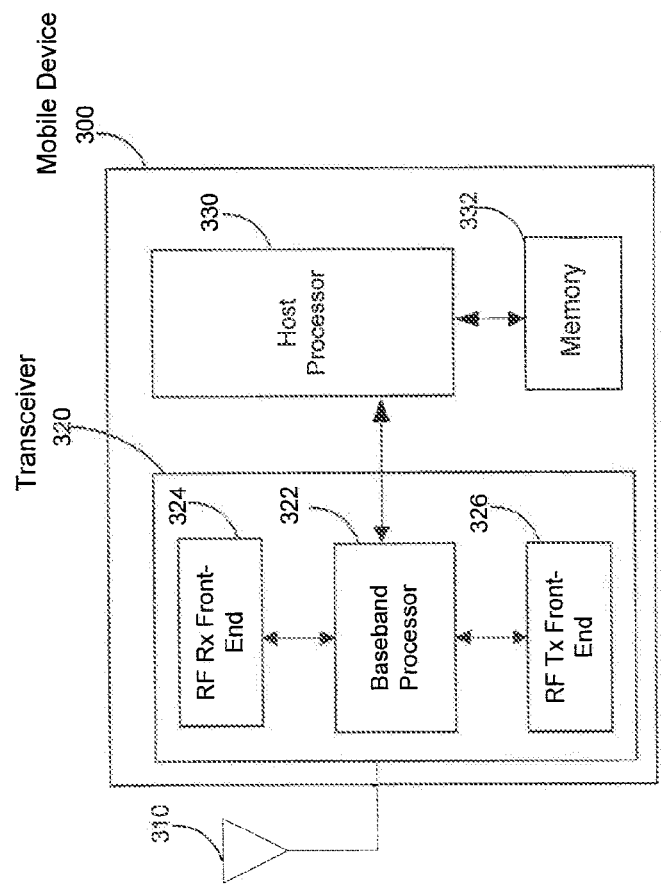
FIG. 3 is a block diagram of an exemplary mobile device that may be operable to perform multiple frequency hypothesis testing with full synch acquisition in an E-UTRA/LTE UE receiver, in accordance with an embodiment of the invention.

FIG. 3 is a block diagram of an exemplary mobile device that may be operable to perform multiple frequency hypothesis testing with full synch acquisition in an E-UTRA/LTE UE receiver, in accordance with an embodiment of the invention. Referring to FIG. 3, there is shown a mobile device 300 comprising an antenna 310, a transceiver 320, a host processor 330 and a memory 332. The transceiver 320 comprises a radio frequency (RF) receiver (Rx) front-end 324, a radio frequency (RF) transmitter (Tx) front-end 326 and a baseband processor 322.

The antenna 310 may comprise suitable logic, circuitry, interfaces and/or code that may be suitable for transmitting and/or receiving electromagnetic signals. Although a single antenna is illustrated, the invention is not so limited. In this regard, the transceiver 320 may be operable to utilize a common antenna for transmission and reception of radio frequency (RF) signals adhering to one or more wireless standards, may utilize different antennas for each supported wireless standard, and/or may utilize a plurality of antennas for each supported wireless standard. Various multi-antenna configurations may be utilized to take advantage of smart antenna technologies, diversity and/or beamforming, for example.

The transceiver 320 may comprise suitable logic, circuitry, interfaces and/or code that may be operable to transmit and/or receive RF signals adhering to one or more wireless standards such as the LTE/E-UTRA standard.

The RF Rx font-end 324 may comprise suitable logic, circuitry, interfaces and/or code that may be operable to process RF signals received, for example, over a LTE/E-UTRA air interface, via the antenna 310. The RF Rx front-end 324 may be operable to convert the received RF signals to corresponding baseband signals. The resulting baseband signals may be communicated with the baseband processor 322 for further baseband processing.

The RF Tx front-end 326 may comprise suitable logic, circuitry, interfaces and/or code that may be operable to process RF signals for transmission. The RF Tx front-end 326 may be operable to receive baseband signals from the baseband processor 128 and convert the baseband signals to corresponding RF signals for transmission via the antenna 310.

The baseband processor 322 may comprise suitable logic, circuitry, interfaces and/or code that may be operable to manage and/or control operations of the RF Rx front-end 324 and the RF Tx front-end 326, respectively. The baseband processor 322 may be operable to communicate baseband signals with the transceiver 320. The baseband processor 322 may be operable to handle baseband signals to be transferred to the RF Tx front-end 326 for transmission and/or process baseband signals from the RF Rx front-end 224. The received baseband signals may comprise synchronization signals such as a PSS and a SSS. The received PSS and SSS may be utilized to acquire transmission timing and other cell-specific parameters such as, for example, associated cell ID and/or antenna configuration used in an associated cell. In this regard, the baseband processor 322 may be operable to generate a plurality of correlation reference sequences (reference PSSs) for acquiring correct PSS timing and/or frequency offset.

Various factors such as, for example, propagation delay, Doppler shift, and/or oscillator drift, may cause a wide range of uncertainties on the correct PSS symbol timing and/or frequency offset. In this regard, the baseband processor 322 may be operable to perform a multiple frequency hypothesis test for accurate PSS symbol timing and/or frequency offset estimation. A PSS correlation process may be performed per MFH branch with the frequency offset estimation. The baseband processor 322 may start the multiple frequency hypothesis testing with a set of intentional frequency offsets. The set of intentional frequency offsets may be selected to evenly cover the desired local oscillator frequency uncertainty range such as, for example, +/−15 ppm. Each MFH branch may be associated with a specific intentional frequency offset selected by the baseband processor 322. In each MFH branch, the baseband processor 322 may be operable to apply an intentional frequency offset to the received baseband signal. The baseband processor 322 may be operable to perform a PSS correlation process on the signal with an intentional frequency offset. A candidate PSS for the received PSS may be selected per MFH branch according to resulting PSS correlation peak magnitudes.

The selected candidate PSS may be used to decode or detect a candidate SSS per MFH branch. For example, in each MFH branch, a PSS specific scrambling code may be identified for the SSS processing. Also, the selected candidate PSS may be used to estimate a channel. The resulting channel estimates may be utilized to decode or detect a candidate SSS per MFH branch for frame boundary synchronization, cell group information identification, and/or cyclic prefix (CP) length. The baseband processor 322 may be operable to select a particular MFH branch implied by the highest PSS correlation peak magnitude over the entire set of MFH branches. The baseband processor 322 may be operable to utilize information from the selected particular MFH branch to communicate properly with a corresponding base station such as the base station 110$a$. The consistency of the cell-specific information, such as cell ID and/or CP length, may be taken into account when applying the frequency estimates from the selected MFH branch for frequency control.

The host processor 330 may comprise suitable logic, circuitry, interfaces and/or code that may be operable to manipulate and control operation of the transceiver 320. The host processor 130 may be operable to communicate data with the transceiver 320 to support applications such as, for example, audio streaming on the mobile device 300.

The memory 332 may comprise suitable logic, circuitry, and/or code that may enable storage of information such as executable instructions and data that may be utilized by the host processor 330 as well as the baseband processor 322. The executable instructions may comprise algorithms that may be applied to various baseband signal processes such as synchronization and/or channel estimation. The memory 332 may comprise RAM, ROM, low latency nonvolatile memory such as flash memory and/or other suitable electronic data storage.

In an exemplary operation, the RF Rx front-end 124 may be operable to process RF signals received via the antenna 310 over the LTE/E-UTRA air interface, for example. The received RF signals may comprise PSSs and SSSs transmitted by base stations such as the base station 110$a$ and/or the base station 120$a$. The received RF signals may be converted to corresponding baseband signals and communicated with the baseband processor 322 for further baseband processing. To communicate with a particular base station such as the base station 110$a$, the baseband processor 322 may be operable to synchronize to cell specific transmission timing such as, for example, the symbol timing and frame boundary used by the base station 110$a$. In this regard, the baseband processor 322 may be operable to generate a plurality of correlation reference sequences (reference PSSs) for acquiring PSS synchronization. To acquire accurate PSS symbol timing and/or frequency offset, the baseband processor 322 may be operable to perform a multiple frequency hypothesis test. The multiple frequency hypothesis testing may start with a set of intentional frequency offsets selected within the required local oscillator accuracy range such as, for example, +/−15 ppm. The baseband processor 322 may be operable to place a specific intentional frequency offset in each MFH branch. A baseband signal associated with the received PSS may be frequency offset via frequency mixing. A PSS correlation process may be performed per MFH branch after frequency mixing.

A candidate PSS for the received PSS may be selected per MFH branch according to corresponding resulting PSS correlation peak magnitudes. In each MFH branch, the baseband processor 322 may be operable to utilize the selected candidate PSS to estimate a channel for decoding or detecting a candidate SSS. Cell-specific information such as, for example, cell ID and/or CP length, may be acquired per MFH branch from the corresponding decoded candidate SSS. A particular MFH branch implied by the highest PSS correlation peak magnitude may be selected over the entire set of MFH branches. The cell-specific information from the selected particular MFH branch may be utilized to enable proper communication with a corresponding base station such as the base station 110a. The consistency of detected cell-specific information, within the selected MFH branch during successive detection attempts and across the set of MFH branches, may be taken into account when applying the frequency estimates from the selected MFH branch for frequency control.

Figure 4:
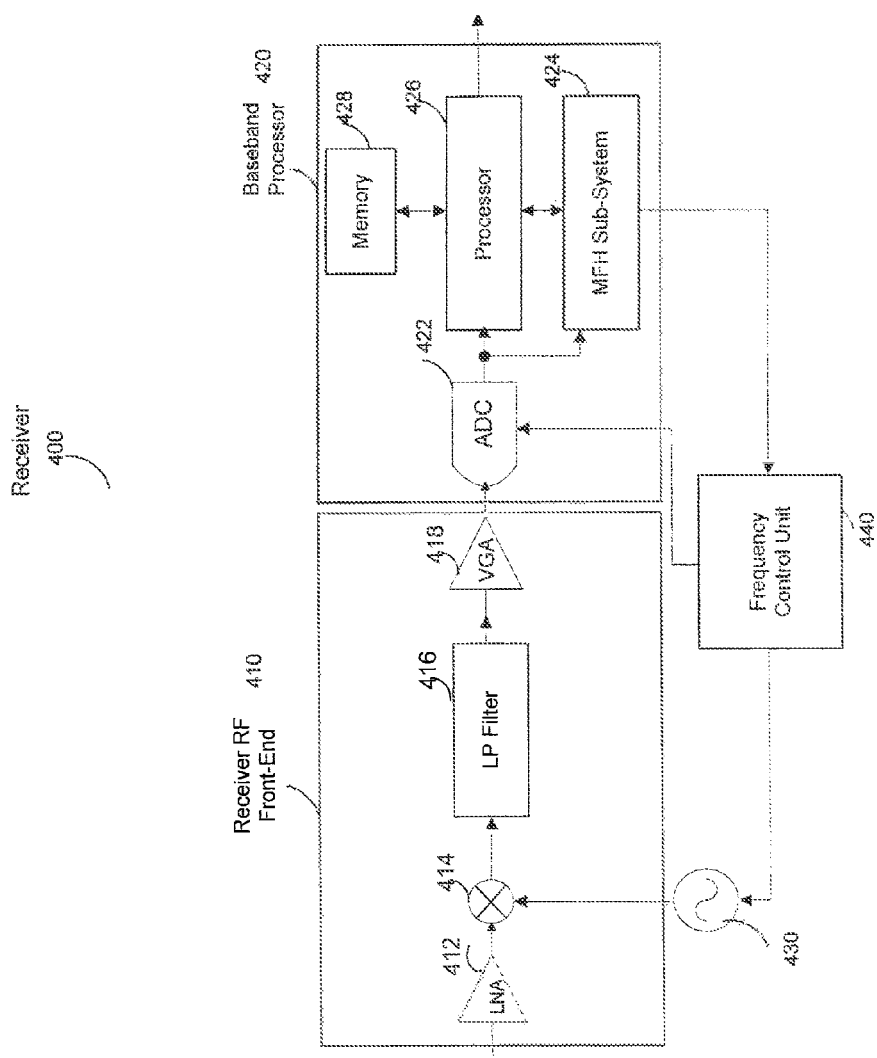
FIG. 4 is a block diagram illustrating an exemplary receiver that is operable to perform multiple frequency hypothesis testing with full synch acquisition in an E-UTRA/LTE UE receiver, in accordance with an embodiment of the invention.

FIG. 4 is a block diagram illustrating an exemplary receiver that is operable to perform multiple frequency hypothesis testing with full synch acquisition in an E-UTRNLTE UE receiver, in accordance with an embodiment of the invention. Referring to FIG. 4, there is shown a receiver 400. The receiver 400 comprises a receiver radio frequency (RF) front-end 410, a baseband processor 420, a local oscillator 430 and a frequency control unit 440. The receiver RF front-end 410 comprises a low noise amplifier (LNA) 412, a mixer 414, a low pass (LP) filter 416, and a variable-gain amplifier (VGA) 418. The baseband processor 420 comprises an analog-to-digital converter (ADC) 422, a multiple frequency hypothesis sub-system 424, a processor 426 and a memory 428.

The receiver RF front-end 410 may comprise suitable logic, circuitry, interfaces and/or code that may be operable to process a RF signal received via the antenna 310. The received RF signal may comprise a PSS and a SSS. The receiver RF front-end 410 may be operable to convert the received RF signal to a corresponding baseband frequency signal, which may be further processed by the baseband processor 420.

The LNA 412 may comprise suitable logic, circuitry, interfaces and/or code that may be operable to amplify a RF signal received by the antenna 310. The LNA 412 may be operable to essentially set a limit for how low a system noise figure may reach. The LNA 412 may be enabled to achieve a low noise performance, which is crucial for a high performance radio frequency (RF) front end.

The mixer 414 may comprise suitable logic, circuitry, interfaces and/or code that may be operable to translate the amplified RF signal from the LNA 412 to a lower, intermediate frequency (IF) signal using signals provided by a local oscillator 430, which is driven by a reference frequency provided by the frequency control unit 440.

The LP filter 416 may comprise suitable logic, circuitry, interfaces and/or code that may be operable to filter the IF signal from the mixer 414 so as to remove unwanted signal components. The LP filter 416 may be operable to convert the resulting IF signal to an analog baseband signal.

The VGA 418 may comprise suitable logic, circuitry, interfaces and/or code that may be operable to amplify the analog baseband signal from the LP filter 416. The VGA 418 may be operable to apply different gains to the analog baseband signal resulting in a variable signal level at the input to the ADC 422.

The ADC 422 may comprise suitable logic, circuitry, interfaces and/or code that may be operable to convert analog baseband signals received from the VGA 418 of the receiver RF front-end 410 to a corresponding digital baseband signal (e.g., bytes). The ADC 422 may be operable to sample the received analog baseband signal at an analog-to-digital sampling rate of, for example, 30.72 MHz, which is derived from the reference frequency provided by the frequency control unit 440. The resulting digital baseband signal may comprise values that are representative of the analog baseband signal amplitudes. The digital baseband signal may be communicated with the MFH sub-system 424 for acquiring correct PSS timing and/or frequency offset. The digital baseband signal may be communicated with the processor 426 for other baseband processing such as the SSS detection.

The MFH sub-system 424 may comprise suitable logic, circuitry, interfaces and/or code that may be operable to perform multiple frequency hypothesis testing for accurate PSS timing and/or frequency offset estimation. The MFH sub-system 424 may be operable to start the multiple frequency hypothesis testing with a set of intentional frequency offsets selected within the desired local oscillator frequency uncertainty range such as, for example, +/−15 ppm. The MFH sub-system 424 may be operable to place an intentional frequency offset in each MFH branch. The MFH sub-system 424 may be operable to apply a frequency offset to a baseband signal via frequency mixing. A PSS correlation process may be performed per MFH branch subsequent to frequency mixing. The MFH sub-system 424 may be operable to select a candidate PSS for the received PSS per MFH branch according to corresponding PSS correlation peak magnitudes.

The MFH sub-system 424 may be operable to perform the SSS detection or decoding per MFH based on corresponding selected candidate PSS. The MFH sub-system 424 may be operable to perform a full synch acquisition within each MFH branch. At the time that a local oscillator frequency offset is determined, the associated cell-specific information such as cell ID and/or CP length may be determined as well. A particular MFH branch that is implied by the highest PSS correlation peak magnitude may be selected over the entire set of MFH branches in the MFH sub-system 424. The consistency of the cell ID information and/or the CP length information from the selected MFH branch may be evaluated over the entire set of MFH branches in the MFH sub-system 424. Frequency estimates from the selected MFH branch may be applied according to the consistency of the cell ID information and/or the CP length information from the selected MFH branch although consistent information may not be necessarily required to apply the frequency offset implied by the selected MFH branch to the local oscillator 430 via the frequency control unit 440. The MFH sub-system 424 may be operable to communicate the cell-specific information from the selected particular MFH branch with the processor 426 so as to communicate properly with a corresponding base station such as the base station 110a.

The processor 426 may comprise suitable logic, circuitry, interfaces and/or code that may be operable to process digital baseband signals from the ADC 422. The processor 426 may be operable to perform various baseband procedures such as channel equalization using information from the MFH sub-system 424.

The memory 428 may comprise suitable logic, circuitry, interfaces and/or code that may enable storage of information such as executable instructions and data that may be utilized by associated components such as the processor 426 in the receiver 400. The executable instructions may comprise algorithms that may be applied to various baseband procedures such as channel estimation, channel equalization, and/or channel coding. The data may comprise timing and/or frequency offset hypotheses. The memory 428 may comprise RAM, ROM, low latency nonvolatile memory such as flash memory and/or other suitable electronic data storage.

The local oscillator 430 may comprise suitable logic, circuitry, interfaces and/or code that may be operable to provide a mixing signal to the mixer 414 of the receiver 400. The local oscillator 430 may be operable to be adjustable in frequency on the basis of a reference signal provided by the frequency control unit 440 according to frequency offset estimates provided by the MFH sub-system 424.

The frequency control unit 440 may comprise suitable logic, circuitry, interfaces and/or code that may be operable to control the settings for the corresponding reference frequency of the local oscillator 430 and the ADC 422. The frequency control unit 440 may be operable to adjust the reference frequencies of the local oscillator 430 and the ADC 422, respectively, according to the frequency offset estimates from the MFH sub-system 424. The operation of the frequency control unit 440 may be operable to control the timing and/or the local oscillator frequency of the receiver 400.

In an exemplary operation, the receiver 400 may be operable to receive a RF signal from the antenna 310, for example. The received RF signal may comprise a PSS and a SSS. The receiver RF front-end 410 may be operable to amplify the received RF signal via the LNA 412 and convert it to a baseband signal via the mixer 414 and the LP filter 416, respectively. The baseband signal may be amplified via the VGA 418 and converted to a digital baseband signal via the ADC 422. The digital baseband signal may be processed by the MFH sub-system 424 for acquiring accurate PSS timing and/or frequency offset estimates. The MFH sub-system 424 may be operable to offset in frequency the digital baseband signal with a selected intentional frequency offset per MFH branch. The actual frequency of the selected intentional frequency offsets may be determined based on the desired frequency estimation resolution and available resources such as available memory during the initial phase of synchronization/signal acquisition. A PSS correlation process may be performed per MFH branch.

The MFH sub-system 424 may be operable to perform the SSS detection after the PSS processing per MFH branch. The MFH sub-system 424 may be operable to perform a full synch acquisition in each MFH branch. The MFH sub-system 424 may be operable to select a particular MFH branch that is implied by the highest PSS correlation peak magnitude over the entire set of MFH branches. The cell-specific information such as a cell ID and/or CP length from the selected particular MFH branch may be communicated with the processor 426 so as to communicate properly with a corresponding base station such as the base station 110a. Frequency offset estimates from the selected MFH branch may be applied for frequency control and the confidence in the estimated frequency offset may be further enhanced according to the consistency of the cell ID information and/or CP length information from the selected MFH branch although consistency in detected SSS related information may not be a strict requirement for applying the frequency offset information implied by the selected MFH branch.

Figure 5:
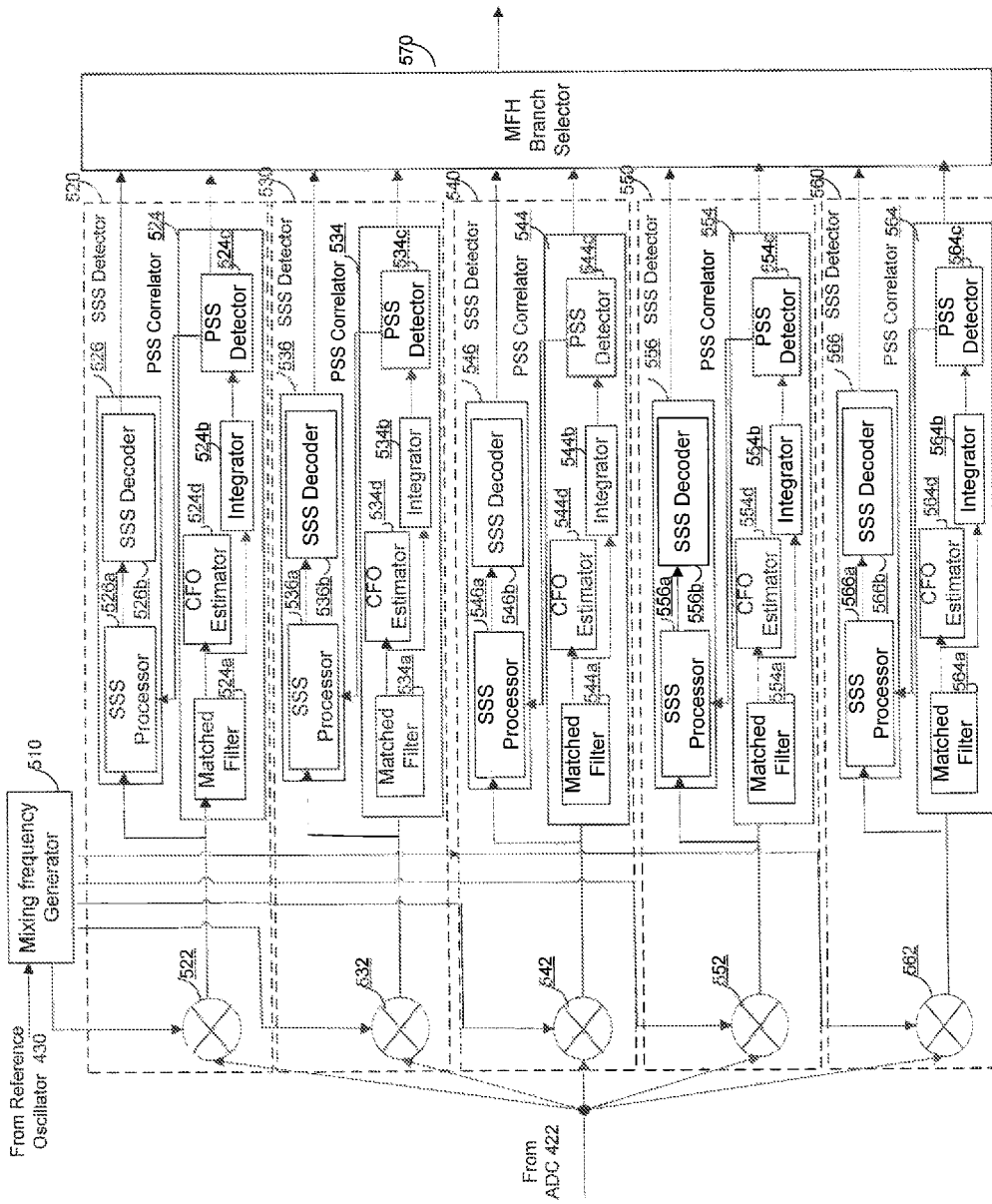
FIG. 5 is a block diagram illustrating an exemplary multiple frequency hypothesis sub-system that is operable to perform multiple frequency hypothesis testing with full synch acquisition in an E-UTRA/LTE UE receiver, in accordance with an embodiment of the invention.

FIG. 5 is a block diagram illustrating an exemplary multiple frequency hypothesis sub-system that is operable to perform multiple frequency hypothesis testing with full synch acquisition in an E-UTRA/LTE UE receiver, in accordance with an embodiment of the invention. Referring to FIG. 5, there is shown a MFH sub-system 500 comprising a mixing frequency generator 510, a set of MFH branches, of which MFH branches 520-560 are illustrated, and a MFH branch selector 570. A MFH branch such as the MFH branch 520 comprises a mixer 522, a PSS correlator 524 and a SSS detector 526. The PSS correlator 524 comprises a matched filter 524a, an integrator 524b, a PSS detector 524c and a frequency offset estimator 524d. The SSS detector 526 comprises a SSS processor 526a and a SSS decoder 526b.

The mixing frequency generator 510 may comprise suitable logic, circuitry, interfaces and/or code that may be operable to generate a plurality of mixing frequencies for the MFH branches 520-560. The mixing frequency generator 510 may be operable to generate the plurality of mixing frequencies so as to place an intentional frequency offset such as, for example, +/−0.5 ppm, in a MFH branch. The actual frequency of the generated mixing frequencies may be determined based on the desired frequency estimation resolution and according to available system resources such as memory. The generated mixing frequencies may imply corresponding timing and/or frequency offsets. The mixing frequency generator 510 may be operable to generate the mixing frequencies such that resulting frequency offsets may be located within the desired local oscillator frequency uncertainty range such as, for example, +/−15 ppm. The generated mixing frequencies may be communicated with the MFH branches 520-560 to offset the digital baseband signal from the ADC 422 per MFH branch, by the desired intentional offset for accurate timing and/or frequency offset estimation.

A MFH branch such as the MFH branch 520 may comprise suitable logic, circuitry, interfaces and/or code that may be operable to perform accurate frequency offset estimation starting with an intentional frequency offset, which is implied by a mixing frequency from the mixing frequency generator 510. The MFH branch 520 may be operable to offset the digital baseband signal frequency, received from the ADC 422, via the mixer 522. The MFH branch 520 may be operable to perform a PSS correlation process on the digital baseband signal resulting from the application of the intentional frequency offset, via the PSS correlator 524. The MFH branch 520 may be operable to perform the SSS detection, per MFH branch, after the PSS correlation process, for cell-specific information, via the SSS detector 526. A full synch acquisition may be performed in the MFH branch 520 for fast synch acquisition. In the MFH branch 520, at the time that the transmission frequency offset is determined, the associated cell-specific information such as the cell ID and/or the CP length may be available as well.

A mixer such as the mixer 522 may comprise suitable logic, circuitry, interfaces and/or code that may be operable to mix the digital baseband signal received from the ADC 422 with a mixing frequency from the mixing frequency generator 510. The mixing frequency may indicate the intentional frequency offset selected for the MFH branch 520.

A PSS correlator such as the PSS correlator 524 may comprise suitable logic, circuitry, interfaces and/or code that may be operable to perform a correlation process to acquire PSS synchronization. The PSS correlator 524 may be operable to perform the correlation process via the matched filter 524a on the signal from the mixer 522. The resulting PSS correlation data may be communicated with the integrator 524b for identifying possible PSS timing hypotheses.

A matched filter such as the matched filter 524a may comprise suitable logic, circuitry, interfaces and/or code that may be operable to correlate signals from the mixer 522 with each of a plurality of local reference PSSs. Resulting PSS correlation data may be provided to the integrator 524b.

An integrator such as the integrator 524b may comprise suitable logic, circuitry, interfaces and/or code that may be operable to accumulate the PSS correlation data from the matched filter 524a over a one or multiple slots duration, for example. Resulting PSS correlation peaks may indicate possible PSS symbol timing hypotheses under consideration.

The PSS detector 524c may comprise suitable logic, circuitry, interfaces and/or code that may be operable to identify a candidate PSS according to the maximum correlation peak magnitudes at the output of the integrator 524b, The position of the maximum correlation peak may indicate PSS symbol timing of the identified candidate PSS in the MFH branch 520. The identified candidate PSS and PSS symbol timing may be communicated with the MFH branch selector 570 to select a particular MFH branch over the entire set of MFH branches.

A frequency offset estimator such as the frequency offset estimator 524d may comprise suitable logic, circuitry, interfaces and/or code that may be operable to estimate a residual frequency offset in the MFH branch 520. In this regard, the frequency offset estimator 524c may be operable to estimate a residual frequency offset in the MFH branch 520 using PSS correlation data from the matched filter 524a.

The MFH branch selector 570 may comprise suitable logic, circuitry, interfaces and/or code that may be operable to select a particular MFH branch over the entire set of MFH branches in the MFH sub-system 500. The MFH branch selector 570 may be operable to determine the particular MFH branch based on the magnitude of the maximum PSS correlation peaks. The selected MFH branch may be implied by the highest PSS correlation peak over the entire set of MFH branches 520-560. As part of the SSS processing within the SSS processor 526a and decoding 526b, consistency of decoded information, per MFH branch, may be established and declared. The MFH branch selector 570 may also be operable to check the consistency of cell ID information and CP length information over the entire set of MFH branches within the MFH sub-system 424. For example, the MFH branch selector 570 may be operable to compare information such as cell ID information and/or CP length information over the entire set of MFH branches. In instances where the cell information and CP length information from the selected MFH branch may be consistent with other MFH branches in the set of the MFH branches, the confidence in the cell ID information and/or the CP length information from the selected MFH branch may be increased. The MFH branch selector 570 may be operable to communicate frequency estimates from the selected MFH branch with the frequency control unit 440. The frequency control unit 440 may be operable to apply the frequency estimates from the selected MFH branch for frequency control according to the consistency of the cell ID information and the CP length information from the selected MFH branch, although consistency of SSS related information may not be a requirement for feeding back frequency offset information to the frequency control unit 440. In the absence of consistent information, the selected MFH branch may still provide a useful frequency offset estimate which may be fed back to the frequency control unit 440. The MFH branch selector 570 may be operable to communicate cell-specific information from the selected MFH branch with the processor 426. The cell-specific information may comprise symbol timing, frame timing, cell ID, and/or CP length. The processor 426 may be operable to utilize the cell-specific information for communications within a corresponding cell.

In an exemplary operation, the MFH sub-system 500 may be operable to receive a corresponding digital baseband signal of a RF signal from the antenna 310, for example. The received RF signal may comprise a PSS and a SSS. The received digital baseband signal may be processed per MFH branch for accurate timing and/or frequency offset of corresponding transmission. In each MFH branch, for example, the MFH branch 520, the digital baseband signal may be frequency offset via the mixer 522. The mixer 522 may be operable to communicate with the mixing frequency generator 510 for a specific mixing frequency. The specific mixing frequency may imply an intentional frequency offset to the digital baseband signal in the MFH branch 520. The mixing frequency may be selected such that the resulting intentional frequency offset may be located within the desired local oscillator frequency uncertainty range such as, for example, +/−15 ppm. A PSS correlation process may be performed by the PSS correlator 524 on the signal from the mixer 522. The matched filter 524a may be operable to correlate the received signal with each of a plurality of local reference PSSs. Resulting correlation data may be communicated with the integrator 524b. The integrator 524b may be operable to accumulate the PSS correlation data from the matched filter 524a over one slot duration, for example. Resulting correlation peaks may imply possible PSS symbol timing hypotheses under consideration.

The PSS detector 524c may be operable to identify a candidate PSS for the received PSS based on the maximum correlation peak magnitude. The position of the maximum correlation peak magnitude may indicate PSS symbol timing associated with the candidate PSS in the MFH branch 520. The frequency offset estimator 524d may be operable to utilize the PSS correlation data received from the matched filter 524a to estimate a residual frequency offset in the MFH branch 520. The MFH branch selector 570 may be operable to select a particular MFH branch over the entire set of MFH branches such as the MFH branches 520-560. The particular MFH branch may be selected based on the magnitude of the highest PSS correlation peak magnitude. The MFH branch selector 570 may be operable to communicate the resulting cell-specific information from the selected particular MFH branch with the processor 426 for other baseband signal processing such as the channel equalization and/or frequency control. The MFH branch selector 570 may be operable to check the consistency of the cell ID information and the CP length information across the entire set of MFH branches and compare it to the consistent information for the selected MFH branch if exists. Frequency estimates from the selected MFH branch may be applied via the frequency control unit 440, firstly based on maximum PSS correlation peak magnitudes and secondly, for additional confidence, based on the consistency of the cell ID information and the CP length information from the selected MFH branch and other MFH branches in the set of MFH branches. The absence of consistent information however may not preclude feeding back the frequency offset estimate implied by and obtained from the selected MFH branch. In the absence of consistent information it may not be possible to make a decision regarding SSS information and correspondingly information related to the base station such as cell ID and Cyclic Prefix length in use but this may not preclude feeding back the frequency offset information obtained.

Figure 6:
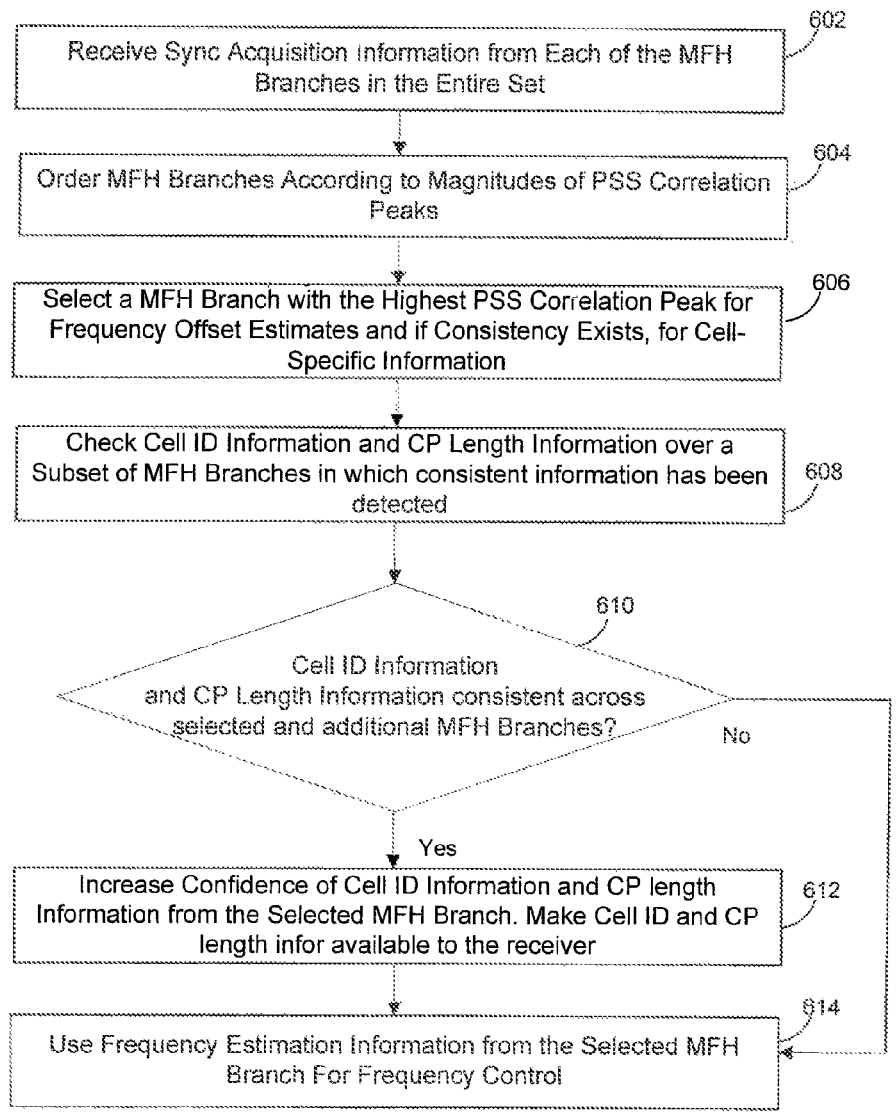
FIG. 6 is a flow chart illustrating an exemplary procedure that is utilized to acquire full synch acquisition information in multiple frequency hypothesis testing in an E-UTRA/LTE UE receiver, in accordance with an embodiment of the invention.

FIG. 6 is a flow chart illustrating an exemplary procedure that is utilized to acquire full synch acquisition information in multiple frequency hypothesis testing in an E-UTRA/LTE UE receiver, in accordance with an embodiment of the invention. The exemplary steps may start with the step 602. In step 602, the MFH branch selector 570 may be operable to receive cell-specific information from each of the entire set of MFH branches such as the MFH branches 520-560. The cell-specific information may be acquired via the PSS synchronization and/or the SSS detection per MFH branch. In step 604, the MFH branch selector 570 may be operable to order the entire set of MFH branches such as the MFH branches 520-560 according to magnitudes of corresponding maximum PSS correlation peaks. In step 606, a MFH branch such as the MFH branch 520 may be selected according to the highest PSS correlation peak magnitude over the entire set of MFH branches such as the MFH branches 520-560. In step 608, the MFH branch selector 570 may be operable to check the cell ID information and the CP length over the entire set of MFH branches. In step 610, it may be determined whether the cell ID information and the CP length information in the selected MFH branch may be consistent with the cell ID and CP length information in other MFH branches. In instances where the cell ID information and the CP length information may be consistent over additional MFH branches within the set of MFH branches, then in step 612, the confidence in or quality of the corresponding cell ID information and the CP length information from the selected MFH branch may be increased and this information may then be used to establish communication with the base station 110a. In cases where consistent information may not be detected in the selected branch or across additional MFH branches in the set of MFH branches, it may not be possible to reliably establish cell ID and/or CP length information and hence additional processing may be required to establish this information. In step 614, the MFH sub-system 424 may be operable to communicate frequency offset estimates from the selected MFH branch with the frequency control unit 440 to be applied for frequency control regardless of whether consistent cell ID and CP length information was detected.

In step 610, in instances where the cell ID information and the CP length information may not be consistent over additional MFH branches within the set of MFH branches, then the exemplary steps proceed in step 614. In cases where consistent information may not exist in the selected MFH branch, it may not be possible to make any declarations regarding cell ID and CP length in use. In such cases, the frequency offset estimate obtained from the selected MFH branch may still be fed back to the frequency control unit 440. In such cases, additional SSS processing may be required to establish cell ID and CP length information more confidently after having fed back the initially estimated frequency offset information which may in turn improve the quality of the baseband signal used for establishing the SSS related information.

In various exemplary aspects of the method and system for multiple frequency hypothesis testing with full synch acquisition in an E-UTRA/LTE UE receiver, a mobile device such as the mobile device 114 may be operable to receive a radio frequency (RF) signal from the base station 110a. The received signal may comprise a PSS and a SSS. The received PSS and SSS may be used by the mobile device 114 to acquire cell-specific parameters via the PSS synchronization and the SSS detection, respectively. To overcome uncertainties on the correct PSS symbol timing and/or correct frequency offset for the received PSS, the mobile device 114 may be operable to perform a multiple frequency hypothesis (MFH) testing via the MFH sub-system 424. The MFH sub-system 424 may be operable to perform the MFH testing using a set of MFH branches such as the MFH branches 520-560.

The mobile device 114 may be operable to decode the received SSS in each of the set of MFH branches. For example, in the MFH branch 520, the SSS decoding may be performed via the SSS decoder 526b in the SSS detector 526. The mobile device 114 may be operable to perform a PSS correlation process per MFH branch. For example, in the MFH branch 520, a PSS correlation processing may be performed via the PSS correlator 524. The matched filter 524a may be operable to correlate a signal for the received PSS with each of local reference PSSs. The resulting correlation data at the output of the matched filter 524a may be integrated via the integrator 524b, over one or multiple time slot. The PSS detection may be performed by selecting a candidate PSS for the received PSS based on the resulting PSS correlation peak magnitudes. The resulting PSS detection information may be provided to the SSS decoder per MFH branch. The cell-specific information such as the cell ID information and/or the CP length information may be acquired per MFH branch based on the corresponding PSS detection and the SSS decoding. After successfully acquiring the cell-specific information per MFH branch, the MFH branch selector 570 may be operable to select a particular MFH branch with a maximum PSS correlation peak over the entire set of MFH branches. The cell-specific information from the selected MFH branch may be utilized by the processor 426 for communications within a cell with the corresponding cell 10. The MFH branch selector 570 may be operable to compare the cell ID information and/or the CP length information over the entire set of MFH branches, such as the MFH branches 520-560, to determine how consistent they are. Frequency estimates from the selected MFH branch may be applied regardless of the consistency of the cell ID information and the CP length information from the selected branch.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for multiple frequency hypothesis testing with full synch acquisition in an E-UTRA/LTE UE receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments failing within the scope of the appended claims.

What is claimed is:

1. A method, comprising:
receiving cell-specific information from a plurality of multiple frequency hypothesis (MFH) branches, wherein the cell-specific information includes a plurality of cell ID information and a plurality of cyclic prefix (CP) length information for the plurality of MFH branches;
selecting a first branch in the plurality of MFH branches based on a primary synchronization sequence (PSS) correlation peak magnitude of the first branch; and
determining a confidence level in first cell ID information and first CP length information corresponding to the first branch by determining whether the first cell ID information and the first CP length information are consistent with the plurality of cell ID information and the plurality of CP length information.

2. The method of claim 1, wherein the first branch is selected based on determining that the first branch has a highest PSS correlation peak magnitude in the plurality of MFH branches.

3. The method of claim 1, wherein receiving the cell-specific information comprises:
receiving the cell-specific information via PSS synchronization for the plurality of MFH branches.

4. The method of claim 1, wherein receiving the cell-specific information comprises:
receiving the cell-specific information via secondary synchronization sequence (SSS) detection for the plurality of MFH branches.

5. The method of claim 1, further comprising:
determining a frequency offset estimate from the first branch; and
communicating the frequency offset estimate to a frequency control unit.

6. The method of claim 1, further comprising:
determining that the confidence level is high in response to determining that the first cell ID information and the first CP length information are consistent with the plurality of cell ID information and the plurality of CP length information.

7. The method of claim 1, further comprising:
determining that the confidence level is low in response to determining that the first cell ID information and the first CP length information are not consistent with the plurality of cell ID information and the plurality of CP length information.

8. The method of claim 7, further comprising:
determining a frequency offset estimate from the first branch;
communicating the frequency offset estimate to a frequency control unit; and
performing, using the frequency offset estimate, additional secondary synchronization sequence (SSS) processing to raise the confidence level.

9. The method of claim 1, further comprising:
decoding a received secondary synchronization sequence (SSS) in the plurality of MFH branches.

10. The method of claim 9, further comprising:
decoding the received SSS based on a channel characteristic associated with the first branch.

11. A system for communication, comprising:
a memory; and
processing circuitry coupled to the memory, wherein the processing circuitry is configured to:
receive cell-specific information from a plurality of multiple frequency hypothesis (MFH) branches, wherein the cell-specific information includes a plurality of cell ID information and a plurality of cyclic prefix (CP) length information for the plurality of MFH branches;
select a first branch in the plurality of MFH branches based on a primary synchronization sequence (PSS) correlation peak magnitude of the first branch; and
determine a confidence level in first cell ID information and first CP length information corresponding to the first branch by determining whether the first cell ID information and the first CP length information are consistent with the plurality of cell ID information and the plurality of CP length information.

12. The system of claim 11, wherein the processing circuitry is further configured to:
select the first branch based on determining that the first branch has a highest PSS correlation peak magnitude in the plurality of MFH branches.

13. The system of claim 11, wherein the processing circuitry is further configured to:
receive the cell-specific information via PSS synchronization for the plurality of MFH branches.

14. The system of claim 11, wherein the processing circuitry is further configured to:
receive the cell-specific information via secondary synchronization sequence (SSS) detection for the plurality of MFH branches.

15. The system of claim 11, wherein the processing circuitry is further configured to:
determine a frequency offset estimate from the first branch; and
communicate the frequency offset estimate from the first branch to a frequency control unit.

16. The system of claim 11, wherein the processing circuitry is further configured to:
determine that the confidence level is high in response to determining that the first cell ID information and the first CP length information are consistent with the plurality of cell ID information and the plurality of CP length information.

17. The system of claim 11, wherein the processing circuitry is further configured to:
determine that the confidence level is low in response to determining that the first cell ID information and the first CP length information are not consistent with the plurality of cell ID information and the plurality of CP length information.

18. The system of claim 17, wherein the processing circuitry is further configured to:
determine a frequency offset estimate from the first branch;
communicate the frequency offset estimate to a frequency control unit; and
perform, using the frequency offset estimate, additional secondary synchronization sequence (SSS) processing to raise the confidence level.

19. The system of claim 11, wherein the processing circuitry is further configured to:
decode a received secondary synchronization sequence (SSS) in the plurality of MFH branches.

20. The system of claim 19, wherein the processing circuitry is further configured to:
decode the received SSS based on a channel characteristic associated with the first branch.

* * * * *